Sept. 15, 1953
M. G. BEKKER
2,652,289
TRACKED GEAR WITH CUSHIONED LUBRICATED
LEAKPROOF SKID SUSPENSION
Filed April 14, 1950
2 Sheets-Sheet 1
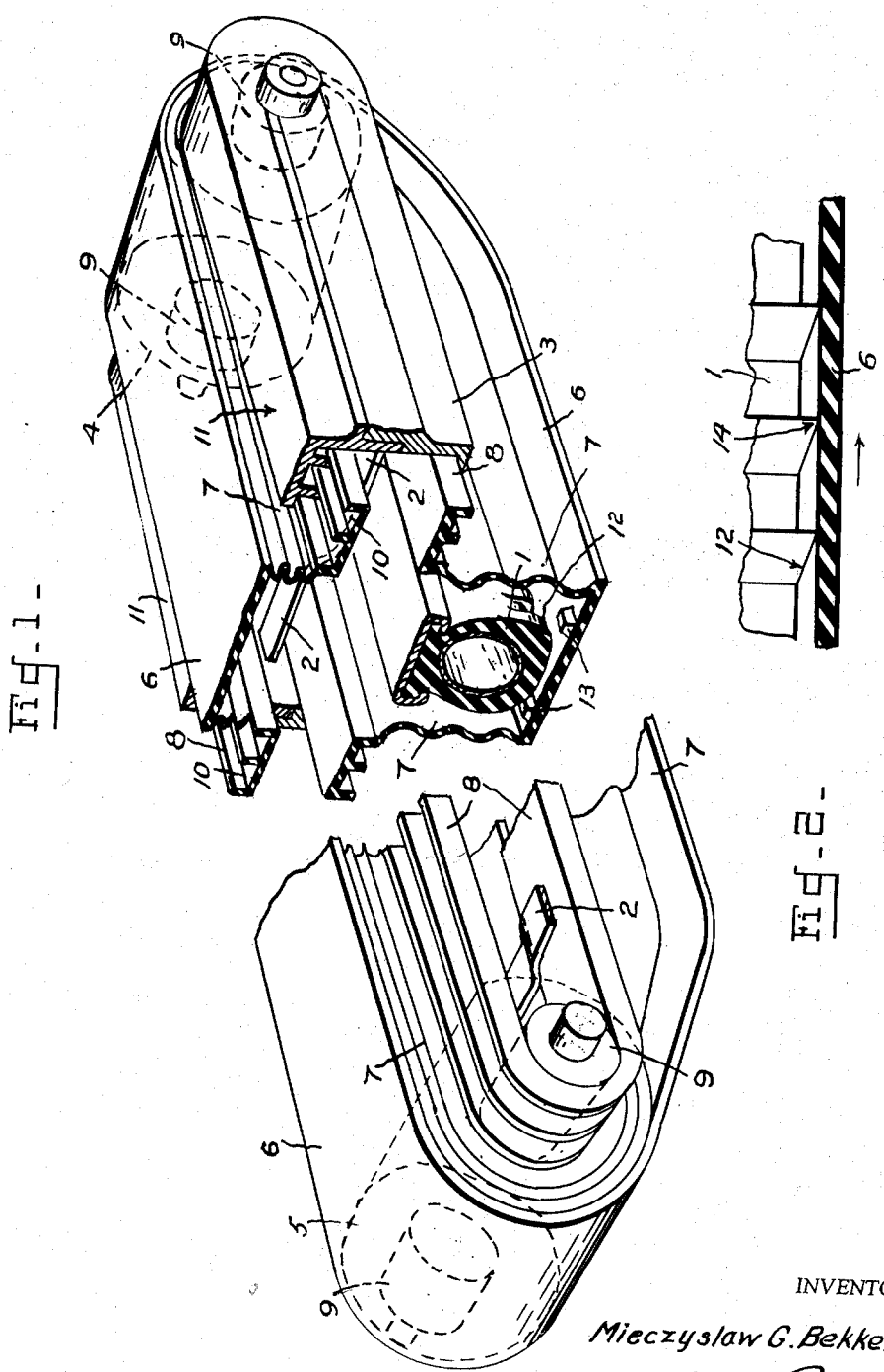
INVENTOR:
Mieczyslaw G. Bekker,
BY
ATTORNEY Sept. 15, 1953   M. G. BEKKER   2,652,289
TRACKED GEAR WITH CUSHIONED LUBRICATED
LEAKPROOF SKID SUSPENSION
Filed April 14, 1950
2 Sheets-Sheet 2
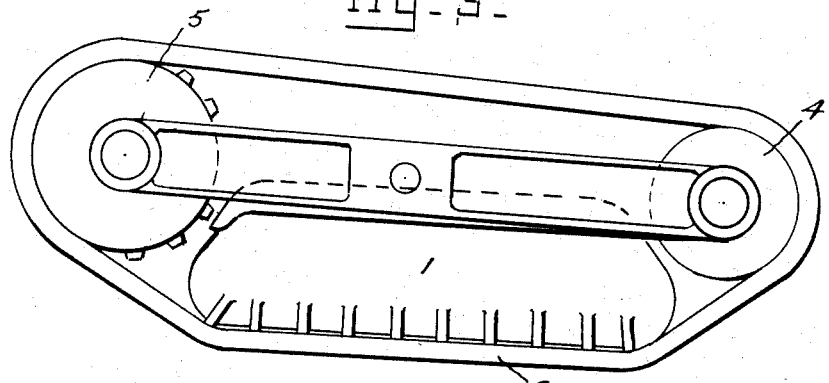
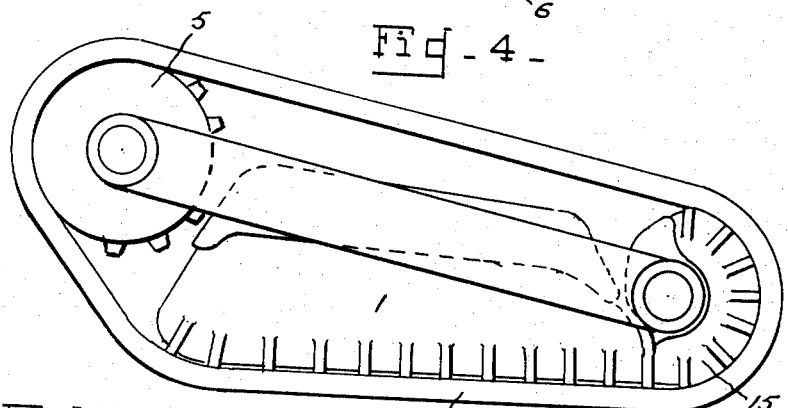
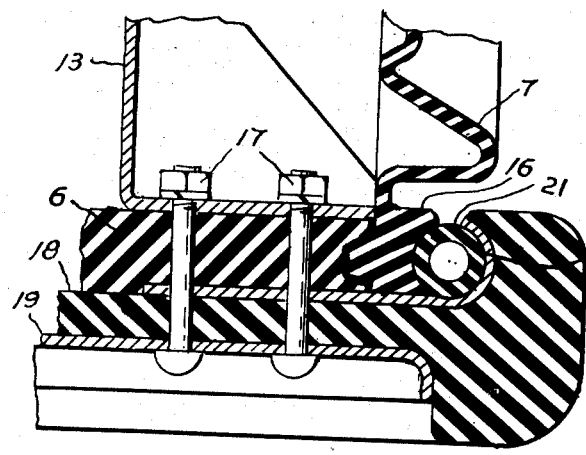
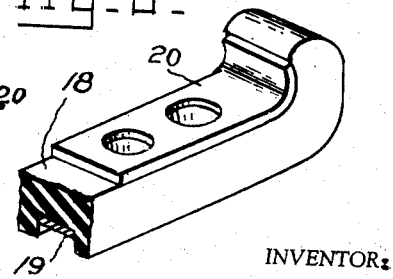
INVENTOR:
Mieczyslaw G. Bekker,
BY
ATTORNEY Patented Sept. 15, 1953

2,652,289

UNITED STATES PATENT OFFICE 2,652,289

TRACKED GEAR WITH CUSHIONED LUBRICATED LEAKPROOF SKID SUSPENSION

Mieczyslaw Gregory Bekker, Hudson County, N. J.

Application April 14, 1950, Serial No. 155,873

14 Claims. (Cl. 305—2)

The invention relates to tracked gears as developed for various vehicles. It is particularly directed to a novel design of a suspension and track with the intention of developing a mechanism which would secure a uniform and truly low ground pressure with the cushioning effect of an elastic tire without mechanical complexity, weight and bulkiness of conventional design as based on spring wheel suspension and ordinary tracks.

Tracked vehicles are now well known and find extensive use under conditions where wheeled vehicles tend to sink into the ground. Industrial and agricultural tractors illustrate one use of tracked vehicles. The development of special military land transport presents another design problem of vital importance.

The tendency in increasing the weight of modern airplanes has initiated many investigations with the purpose of building sufficiently strong runways or designing low pressure tracked landing gears because the existing runways can hardly support loads exercised by heavy airships equipped with ordinary wheeled landing gears.

On the other hand there also has been a tendency of landing, taking off, or taxiing an airplane on a soft ground, in order to enable the aircraft to operate without the necessity of preparation of airports equipped with hard surface runways.

Both these tendencies are contributing to the development of tracked landing gears for various types of aircraft, thus making the use of a track more universal and adopted not only to the development of land vehicles but also of airships.

The basic conception of a tracked gear established during the age of Industrial Revolution is a compromise satisfying a great number of requirements which a tracked vehicle has to conform to. The extent to which any of these requirements is fulfilled depends to a large extent on factors which constitute the conservative line of development and are predominantly outside the control of vehicle designers. In particular the characteristics of the suspension, such as the number and size of the weight carrying wheels, the spacing between them, the absorption and wheel deflection permitted by springs and tires have become limiting factors in the development of a more unconventional design. In other words, the above factors have finally restrained the freedom of general design, and in particular the right distribution of loads (ground pressure) which directly affects the soft ground performance. Also the shock absorbing capacity of the gear is strictly limited by physical weight involved and by mechanical interaction of these factors.

The main functions which a tracked gear of present design trend has to fulfill are set out briefly as follows:

(a) Providing multiwheel carriage on a mobile rail, formed by the moving track, i. e., an equivalent of a railway train.

(b) Increasing the area of ground upon which the load and driving forces are distributed, thus providing a low and uniform ground pressure along the surface of the contact between the ground and a vehicle.

(c) To produce an even and smooth roller path along which the vehicle can run with the minimum of resistance aid maximum shock proofness.

The experience gained during the last half century with these concepts of development of tracked vehicles shows that the multi-wheel carriage design is subject to the same mechanical limitations as those encountered during the last century in design of railway trains. The tracked gear has become heavy, bulky and costly.

The increase of the ground contact area cannot be fully exploited by increasing the track dimensions, because the track portions located between load carrying wheels, are not loaded to the same extent as those loaded directly beneath the wheels.

Thus the pressure acting upon the ground is not uniform, but shows considerably high peaks beneath the wheels. The value of such pressure concentration may exceed several times the value of the so-called misleading (as giving too low values) "mean ground pressure" which is obtained by dividing vehicle weight by the projection of this part of the track which is resting upon the ground.

Experience shows that the above mentioned pressure concentrations are mainly responsible for vehicle sinkage. This was demonstrated by an experiment in which wheels were substituted by steel skids supporting the whole track portion previously supported by wheels. A tracked vehicle equipped with skids sunk less because the real ground pressure was much lower, more uniform, and closer to the "mean ground pressure." In consequence the track could operate on much softer soils.

The main disadvantage was, of course, the friction between skids and tracks. This friction has increased the movement resistance of the vehicle even above the resistance caused by ordinary wheels. It should be noted that the latter when exercising peak pressure do not run on a smooth track path but steadily climb the curved track portion located beneath the wheels and formed by lowering of ground pressure between wheels.

Besides the above mentioned disadvantages of a skid suspension the unavoidable necessity of springing skids in the same way as this of springing wheels has encountered the same old difficulties in damping shocks subjected to the vehicle.

It is the object of this invention to make practicable the idea of skid supported tracks by avoiding mechanical difficulties related to the design of wheeled suspension, and by incorporating the cushioning element of a lubricated, leak proof, low resistance skid suspension for tracked gears.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a view in perspective, partially in cross-section, of a tracked gear in accordance with the present invention;

Figure 2 is a fragmentary cross-sectional view through a portion of the bottom run of the track and elastic support and illustrating the spaced ribs on the elastic support forming lubrication channels between the track and support;

Figures 3 and 4 are diagrammatic side views in elevation of modified embodiments of the invention;

Figure 5 is an enlarged fragmentary cross-sectional view through an edge of the track and showing the joint between the track and a side enclosing diaphragm, and Figure 6 is a fragmentary view in perspective of pad or cleat for the track.

Experimental work performed indicates that frictional forces between two sliding lubricated rubber, or plastic surfaces are very low and comparable to the resistance of rolling a low pressure rubber tire. This led to the development of a tracked gear shown schematically in Fig. 1.

An elastic support 1, shown in Fig. 1 as an elongated pneumatic cushion is secured through beams 2 with the main frame 3. For simplicity of illustration, the frame 3 is omitted at the front part of Figure 1.

Frame 3 carries at both ends bearings accommodating two drum-like wheels 4 and 5. These wheels carry track 6 which is directly supported by cushion 1. The whole space enclosed by track 6 is sealed by means of ring-shaped, elastic diaphragms 7 secured along their outer side to track 6 and along their inner side to two elastic bands 8 which are carried by smaller wheels 9 rotating with the same speed as wheels 4 and 5.

Bands 8 are provided on their outside surface with grooves 10 as shown on Fig. 1. These grooves are matched by grooved cover 11 which is schematically shown as being a part of main frame 3. Frame-cover 3—11 encloses grooved bands 8 and thus seals off by means of a labyrinth-like seal the whole inside part of the mechanism. Surfaces of friction between the stationary cushion 1 and moving track 3 may then be lubricated without losing lubricant on one hand, and without interference of dust and dirt on the other.

Lubrication of these surfaces is helped by providing cushion 1 with ribs 12. Spaces between ribs hold lubricant ready for action. Track 6 is guided along ribbed cushion 1 by means of guides 13.

Proper lubrication may be secured by tapering ribs 12 in the direction of the movement of track 6 shown by an arrow on Fig. 2. Thus the lubricant will be helped to enter the high pressure zone near wedge 14 of the rib and the track portion supported by this wedge.

In the case of a driven track, or that subjected to braking it may be advisable to provide the front wheel 5 with teeth or similar other arrangement. The above solution is shown in Fig. 3. Elastic cushion 1 supports track 6 which may be driven, or braked by matching sprocket 5. Idler 4 is of the same design as this shown in Fig. 1. It may be conceivable, however, even to replace this idler by an extension of cushion 1. This is shown in Fig. 4. In such case a half-pneumatic type 15 provides the support for track 6 which is rested upon by cushion 1. This arrangement however would be suitable for non-driven tracks (trailers, landing gears), which can be braked by means of brakes fitted in sprocket 5.

On both Figs. 3 and 4 the sealing devices 7—8 have been omitted for the sake of simplicity.

Fig. 1 shows schematically as if track 6, diaphragms 7 and grooved bands 8 were made out of one piece of elastic material. Such design would be highly impractical, if possible at all. As an alternative a three piece combination is partially shown on Fig. 5. This combination is composed of track 6 and of a pair of seals each consisting of grooved band 8 and diaphragm 7. Since the way of connecting diaphragm 7 with track 6 is of interest alone, this detail only is shown in Fig. 5.

A part of the transverse cross-section of track 6, including one of its lateral sides, is shown with the portion of the cross-section of diaphragm 7. Each lateral side of track 6 is provided with a groove whose, for example, trapezoidal shape is shown in right hand part of Fig. 5.

Diaphragm 7 is provided with matching border 16 which fits the groove of track 6. Bolts 17 which secure guides 13 to track 6, and which have not been shown on previous drawings hold simultaneously detachable pad 18 (also not shown on previous drawings), strengthened by means of metallic inserts 19. They also hold a curved plate 20 (see also Fig. 6). Between this plate and border 16 a sealed rubber hose 21 is inserted. After pumping air in hose 21, the air pressure expands the rubber and keeps tight the connection between track 6 and border 16 to which diaphragm 7 is welded. Thus the connection between the track and its seals is made without losing the necessary elasticity and with preserving all the required tightness. Also the simplicity of mounting and dismantling has been achieved.

The above described solution applies to all types of vehicles, and in particular to trailers, aircraft landing gears and lightweight self-propelled vehicles.

In the case of heavy vehicles, in which it may be difficult to achieve the cushioning effect by means of a pneumatic cushion, steel skids similar to these previously mentioned may be conceivable as the necessary evil, and the sealing of lubricated rubbing surfaces may be obtained in the proposed way. In this case, of course, the track design would be different. Rubber band 6 which in the described invention has played the role of the track itself may be reduced to the role of a cover sealing the internal sides of a heavy steel track.

The number of pneumatic cushions used in one gear may be as large as required, especially in the case of long mechanisms. Also use of parallel cushions may be envisaged. The surface under friction may be strengthened by means of metallic inserts.

The embodiment of the invention in which an exclusive property or privilege is claimed are defined as follows:

1. A tracked gear comprising an elongated resilient support means, a frame carried by said support means, curved guide means supported by said frame adjacent each end of said support means, at least one of said guide means comprising a rotatable member, and an endless track slidably trained around said guide means and under said support means to carry said support means.

2. A tracked gear comprising an elongated elastic inflatable member, curved guide means supported by and adjacent each end of said inflatable member, an endless track slidably trained around said guide means and under said inflatable member to carry said inflatable member, flexible sides on said track forming a reservoir for lubricant within the lower run of said track, and spaced support elements between said track and said inflatable member and forming passages therebetween for the lubricant.

3. A tracked gear comprising an elongated elastic support means, curved guide means supported by and adjacent each end of said support means, an endless track slidably trained around said guide means and under said support means to carry said support means, flexible diaphragms on the sides of said track to retain lubricant within said track, said track having channels along each side thereof with the edges of said diaphragms fitted in said channels, and fluid expansible means in said channels and clamping said diaphragm edges when expanded.

4. A tracked gear comprising an elongated elastic support means, a frame member carried by said support means, curved guide means supported by said frame member adjacent each end of said support means, an endless track member slidably trained around said guide means and under said support means to carry said support means, and flexible diaphragms between the sides of said track member and said frame member to retain lubricant within said track member, said diaphragms being fixed to one of said members and slidable sealing means between said diaphragms and the other of said members.

5. A tracked gear comprising an elongated elastic support means, a frame carried by said support means, curved guide means supported by said frame adjacent each end of said support means, an endless track slidably trained around said guide means and under said support means to carry said support means, flexible diaphragms fixed to said track adjacent each side thereof, rollers journalled on said frame at each side of and coaxial with said guide means, flexible bands trained around said rollers and fixed to the inner edges of said diaphragms, and lubricant seals between said bands and said frame and permitting relative movement therebetween.

6. A tracked gear as defined in claim 5 wherein the slidably engaging parts of said support means and said track comprise a rubber-like material.

7. A tracked gear as defined in claim 6 wherein said support means comprises an elongated pneumatic member.

8. A tracked gear as defined in claim 5 wherein said lubricant seals comprise channels respectively carried by said bands and said frames, said channels being disposed in facing relation with their respective flanges interfitting each other.

9. A tracked gear as defined in claim 5 wherein said frame has closed side portions and said lubricant seals are between said bands and said frame side portions, whereby the sides of the gear are completely enclosed.

10. A tracked gear as defined in claim 5 wherein the fixed connection between said diaphragms and said track comprises channels along each side of the track, the edges of the diaphragms being fitted in said channels, and fluid expandable means in said channels and clamping said diaphragm edges when expanded.

11. A tracked gear as defined in claim 5 wherein spaced support elements are interposed between said track and said support means and form lubricant passages therebetween.

12. A tracked gear as defined in claim 5 wherein said support means has spaced transverse ribs engaging said track, the outer surfaces of said ribs being inclined toward their edges which are in normally trailing relation to said track.

13. A tracked gear as defined in claim 5 wherein said curved guide means at one end of said support means comprise a wheel journalled on said frame, drive means between said track and wheel, and means connected with said wheel for controlling the rotation thereof.

14. A tracked gear comprising an elongated pneumatic member, a frame carried by said member, curved guide means supported by said frame adjacent each end of said member, and an endless track slidably trained around said guide means and under said member to carry said member.

MIECZYSLAW GREGORY BEKKER.

References Cited in the file of this patent

UNITED STATES PATENTS

| Number | Name | Date |
|---|---|---|
| 359,468 | Pierce | Mar. 15, 1887 |
| 809,048 | Furchtbar | Jan. 2, 1906 |
| 849,882 | Bartley | Apr. 9, 1907 |
| 2,346,848 | Law | Apr. 18, 1944 |
| 2,383,754 | Watt | Aug. 28, 1945 |
| 2,483,170 | Askue | Sept. 27, 1949 |
| 2,484,754 | Silva | Oct. 11, 1949 |
| 2,575,845 | Singer | Nov. 20, 1951 |
| 2,581,365 | Darragh | Jan. 8, 1952 |